US012633211B2

(12) United States Patent
Yang et al.

(10) Patent No.: US 12,633,211 B2
(45) Date of Patent: May 19, 2026

(54) TRAFFIC ACCIDENT PREDICTION SYSTEMS AND METHODS

(71) Applicant: Qatar Foundation for Education, Science and Community Development, Doha (QA)

(72) Inventors: David Yang, Doha (QA); Chaojie Li, Doha (QA); Mansoor Al-Thani, Doha (QA)

(73) Assignee: HAMAD BIN KHALIFA UNIVERSITY, Doha (QA)

( * ) Notice: Subject to any disclaimer, the term of this patent is extended or adjusted under 35 U.S.C. 154(b) by 767 days.

(21) Appl. No.: 17/979,488

(22) Filed: Nov. 2, 2022

(65) Prior Publication Data

US 2023/0140289 A1 May 4, 2023

Related U.S. Application Data

(60) Provisional application No. 63/275,206, filed on Nov. 3, 2021.

(51) Int. Cl.
| | |
|---|---|
| *G08G 1/01* | (2006.01) |
| *G06N 3/045* | (2023.01) |
| *G06N 3/049* | (2023.01) |
| *G06N 3/08* | (2023.01) |

(52) U.S. Cl.
CPC .......... *G08G 1/0133* (2013.01); *G06N 3/045* (2023.01); *G06N 3/049* (2013.01); *G06N 3/08* (2013.01); *G08G 1/0129* (2013.01)

(58) Field of Classification Search
CPC .... G08G 1/0133; G08G 1/0129; G08G 1/202; G08G 1/012; G06N 3/045; G06N 3/049; G06N 3/08; G06N 3/048; G06N 3/0455; G06N 3/0464; G06N 3/044
See application file for complete search history.

(56) References Cited

U.S. PATENT DOCUMENTS

| | | | |
|---|---|---|---|
| 9,286,793 B2 | 3/2016 | Pan et al. | |
| 10,853,720 B1 * | 12/2020 | Calmon ................. | G06Q 50/40 |
| 2020/0090502 A1 * | 3/2020 | Yang .................... | G08G 1/0112 |
| 2022/0068123 A1 * | 3/2022 | Guo ..................... | G08G 1/0112 |
| 2024/0054321 A1 * | 2/2024 | Bogaerts ............... | G06N 3/084 |

FOREIGN PATENT DOCUMENTS

| | | |
|---|---|---|
| CN | 111161535 B | 3/2021 |

OTHER PUBLICATIONS

Zhang et al. (GACAN: Graph Attention-Convolution-Attention Networks for Traffic Forecasting Based on Multi-granularity Time Series, arXiv, published Oct. 27, 2021, pp. 1-8). (Year: 2021).*

(Continued)

*Primary Examiner* — Tan H Tran
(74) *Attorney, Agent, or Firm* — K&L Gates LLP

(57) ABSTRACT

Traffic accident prediction systems and methods are provided. The traffic accident prediction systems and methods include an accident prediction model that utilizes a spatiotemporal attention-based multi-graph convolution neural network to predict the number of traffic accidents in a predetermined region over a predetermined period of time in order to assist with the efficient dispatch of public safety resources to respond to traffic accidents.

15 Claims, 6 Drawing Sheets

(56) References Cited

OTHER PUBLICATIONS

Yu et al. (Deep Learning: A Generic Approach for Extreme Con-
dition Traffic Forecasting, published 2017, pp. 1-9). (Year: 2017).*
Bai et al. (Adaptive Graph Convolutional Recurrent Network for
Traffic Forecasting, arXiv, published 2020, pp. 1-16). (Year: 2020).*
Yang, et al: "A Multi-modal Graph Neural Network Approach to
Traffic Risk Forecasting in Smart Urban Sensing"; Int'l Conf. on
Sensing, Communication and Networking; 2020; (9 pages).
Chandar, et al; "Road Accident Proneness Indicator Based on Time,
Weather and Location Specificity Using Graph Neural Networks";
19th IEEE Int'l Conf. on Machine Learning and Applications; Oct.
2020; (7 pages).
Jiang, et al.; "Graph Neural Network for Traffic Forecasting: A
Survey"; Latex Class Files, vol. 14, No. 8; Aug. 2015; (87 pages).
Codur, et al; "An Artificial Neural Network Model for Highway
Accident Prediction: A Case Study of Erzurum, Turkey"; Traffic &
Transportation, vol. 27, No. 3, pp. 217-225; 2015; (10 pages).
Mandal, et al.; "Artificial Intelligence-Enabled Traffic Monitoring
System"; Sustainability, vol. 12; 2020; (21 pages).
Su, et al.; "Intelligent Traffic Management System Drives Collabo-
ration for Shenzhen Traffic Police"; https://e.huawei.com/uk/
publications/global/ict_insights/201902271023/Success-Story/
201904161628; (7 pages).
Sina Dabiri; "AI for Advertising: Everything You Need to Know";
2018; https://vtechworks.lib.vt.edu/bitstream/handle/10919/87409/
Dabiri_S_D_2019.pdf?isAllowed=y&sequence=1; (187 pages).

\* cited by examiner

400

500

Receive traffic
information
501

Construct Multiple
Graphs
502

Train an accident
prediction model
503

Determine predicted
traffic accidents
504

600

TRAFFIC ACCIDENT PREDICTION SYSTEMS AND METHODS

CROSS-REFERENCES TO RELATED APPLICATIONS

The present disclosure claims priority to U.S. Provisional Patent Application 63/275,206 titled "Traffic Accident Prediction Systems and Methods" having a filing date of Nov. 3, 2021, the entirety of which is incorporated herein.

BACKGROUND

Traffic police patrol are typically dispatched uniformly to urban zones, with the aim of covering as much area as possible in order to respond to traffic accidents as quickly as possible. The problem with this approach, however, is that traffic accident distribution is not uniform, e.g., some busy zones during rush hour traffic tend to have more accidents than other areas. Consequently, patrol vehicles sent to zones with many accidents are often busy, while other patrol vehicles may unnecessarily roam about in zones with no accidents, thereby leading to suboptimal response time to accidents. Manually adjusting a dispatching plan for patrol vehicles is tedious and error-prone, since the number of accidents in each zone varies depending on a time of the day, day of the week, weather, special events or holidays, road changes, ongoing construction work, existing accidents, etc.

One solution to manually adjusting a dispatching plan is to train an intelligent dispatching system that uses a machine learning model to proactively predict a number of traffic accidents in each zone in the next police patrol shift. More patrol vehicles may then be dispatched to zones with an anticipated high traffic accident rate in the next relevant time period (e.g., next few hours). This approach models the number of accidents in each zone as an independent time series without attributes. Such an approach fails to take into account other important factors that can affect a predicted accident rate in a zone, such as the number of accidents in neighboring zones and external factors such as weather conditions.

Accordingly, a need exists for an intelligent system that predicts traffic accidents in a predetermined area over a predetermined period of time, in order to assist with the efficient distribution of public safety resources to respond to these traffic accidents.

SUMMARY

The present disclosure generally relates to traffic accident prediction systems and methods.

In light of the present disclosure, and without limiting the scope of the disclosure in any way, in an aspect of the present disclosure, which may be combined with any other aspect listed herein unless specified otherwise, a system for a traffic accident prediction is provided.

In an aspect of the present disclosure, which may be combined with any other aspect listed herein unless specified otherwise, the traffic accident prediction system includes a processor in communication with a memory, where the processor is configured to receive information related to traffic accidents and determine using an accident prediction model to determine a predicted amount of traffic accidents in a predetermined geographic region over a predetermined period of time.

In an aspect of the present disclosure, which may be combined with any other aspect listed herein unless specified otherwise, a processor is further configured to preprocess the received information for use in the accident prediction model, by extracting a feature matrix of features of interest from the received information In an aspect of the present disclosure, which may be combined with any other aspect listed herein unless specified otherwise, accident prediction model combines multiple graphical representations of the received information related to traffic accidents using a graph convolutional network.

In an aspect of the present disclosure, which may be combined with any other aspect listed herein unless specified otherwise, accident prediction model combines multiple graphical representations of the received information related to traffic accidents using a graph convolutional network.

In an aspect of the present disclosure, which may be combined with any other aspect listed herein unless specified otherwise, the accident prediction model performs a mapping function to predict an accident number count for a predetermined area over a predetermined period of time.

In another aspect of the present disclosure, which may be combined with any other aspect listed herein unless specified otherwise, the accident prediction model may be implemented in the form of a spatiotemporal attention-based, multi-graph convolutional neural network.

In another aspect of the present disclosure, which may be combined with any other aspect listed herein unless specified otherwise, the accident prediction model is comprised of a plurality of machine learning models.

In another aspect of the present disclosure, which may be combined with any other aspect listed herein unless specified otherwise, the accident prediction model outputs the predicted amount of traffic accidents in a predetermined geographic region over a predetermined period of time in the form of a traffic accident prediction map.

In another aspect of the present disclosure, which may be combined with any other aspect listed herein unless specified otherwise, a method for traffic accident prediction consists of receiving information related to traffic accidents in a predetermined geographic region, constructing multiple graphical representations of the received information, and training a machine learning model to predict the number of traffic accidents using the graphical representations of the received information.

In another aspect of the present disclosure, which may be combined with any other aspect listed herein unless specified otherwise, the method for traffic accident prediction further comprises, extracting a feature matrix from the received information related to traffic accidents which is used to construct multiple graphical representations of the received information.

In another aspect of the present disclosure, which may be combined with any other aspect listed herein unless specified otherwise, a method for traffic accident prediction includes receiving a feature matrix of features of interest for a predetermined area and over a predetermined time.

In another aspect of the present disclosure, which may be combined with any other aspect listed herein unless specified otherwise, wherein constructing multiple graphical representations of the received information as a part of a method of traffic accident prediction, includes an adaptive adjacency matrix, which self-learns hidden dependencies between entries in a feature matrix included in the received information.

In another aspect of the present disclosure, which may be combined with any other aspect listed herein unless specified otherwise, the method for traffic accident prediction further comprises, visually projecting a predicted number of traffic accidents on a traffic accident prediction map.

In another aspect of the present disclosure, which may be combined with any other aspect listed herein unless specified otherwise, training a machine learning model, as a part of a method of traffic accident prediction comprises, includes an extracting features of interest from the received information, performing a multi-graph, multi-layer convolution, applying a spatial attention mechanism, implementing a recurrent network to update future calculations based on past calculations, supplying the machine learning model with known future information, applying a temporal attention mechanism, and outputting a predicted number of traffic accidents for a predetermined area over a predetermined period of time.

In another aspect of the present disclosure, which may be combined with any other aspect listed herein unless specified otherwise, training a machine learning model, as a part of a method of traffic accident prediction, includes implementing a recurrent network wherein implementing a recurrent network includes a long term short memory neural network.

In another aspect of the present disclosure, which may be combined with any other aspect listed herein unless specified otherwise, wherein outputting a predicted number of traffic accidents for a predetermined area over a predetermined period of time, as a part of a method of traffic accident prediction, includes visually projecting the predicted number of traffic accidents on a traffic accident prediction map.

The reader will appreciate the foregoing details, as well as others, upon considering the following detailed description of certain non-limiting embodiments including a traffic accident prediction system and method according to the present disclosure.

BRIEF DESCRIPTION OF THE DRAWINGS

The accompanying figures depict various elements of the one or more embodiments of the present disclosure, and are not considered limiting of the scope of the present disclosure.

In the Figures, some elements may be shown not to scale with other elements so as to more clearly show the details. Additionally, like reference numbers are used, where possible, to indicate like elements throughout the several Figures.

DETAILED DESCRIPTION

The present disclosure generally relates to traffic accident prediction systems and methods.

Figure 1:
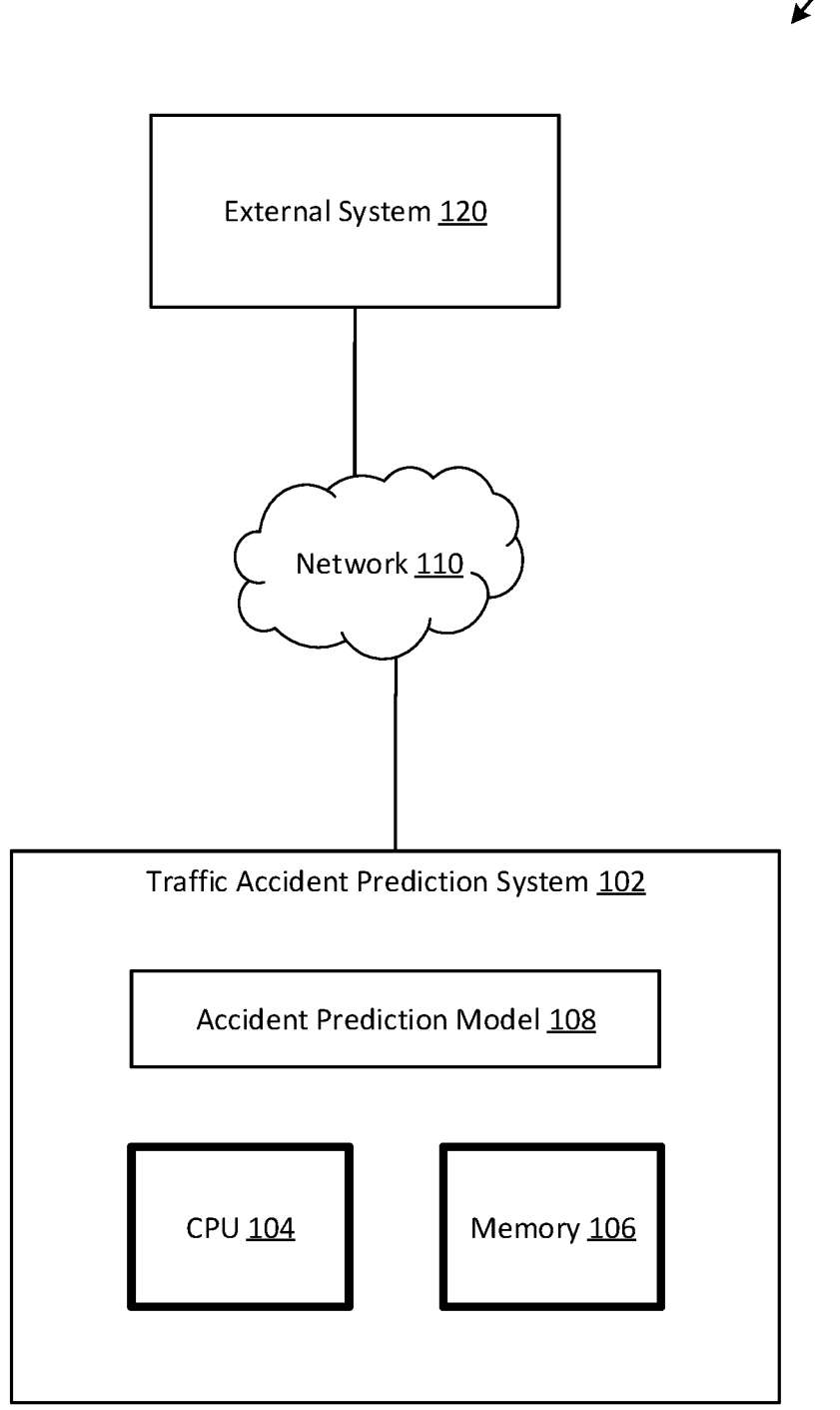
FIG. 1 illustrates an example system for predicting traffic accidents, according to an aspect of the present disclosure.

FIG. 1 illustrates an example system 100 for predicting traffic accidents in predetermined geographic zones. The system 100 may include a traffic accident prediction system 102. In various aspects, the traffic accident prediction system 102 may include a processor in communication with a memory 106. The processor may be a CPU 104, an ASIC, or any other similar device. The traffic accident prediction system 102 may include an accident prediction model 108 trained to predict traffic accidents in a predetermined geographic region during a predetermined time period based on various factors. The accident prediction model 108 may be implemented by one or more suitable machine learning models, including one or more supervised learning models, unsupervised learning models, or other types of machine learning models. For example, the accident prediction model 108 may be implemented as a deep, attention-based graph neural network (GNN). In other examples, the components of the traffic accident prediction system 102 may be combined, rearranged, removed, or provided on a separate device or server.

The traffic accident prediction system 102 may be in communication with an external system 120 over a network 110. The network 110 can include, for example, the Internet or some other data network, including, but not limited to, any suitable wide area network or local area network. The external system 120 may collect various data that it transmits to the traffic accident prediction system 102 for accident prediction. For example, the external system 120 may transmit traffic data, weather data, etc. In some aspects, the traffic accident prediction system 102 may collect this data itself and not need to collect any data from the external system 120.

The traffic accident information may include factors such as specific time, location, road type, road conditions, and weather conditions for the predetermined geographic area of interest.

Figure 2:
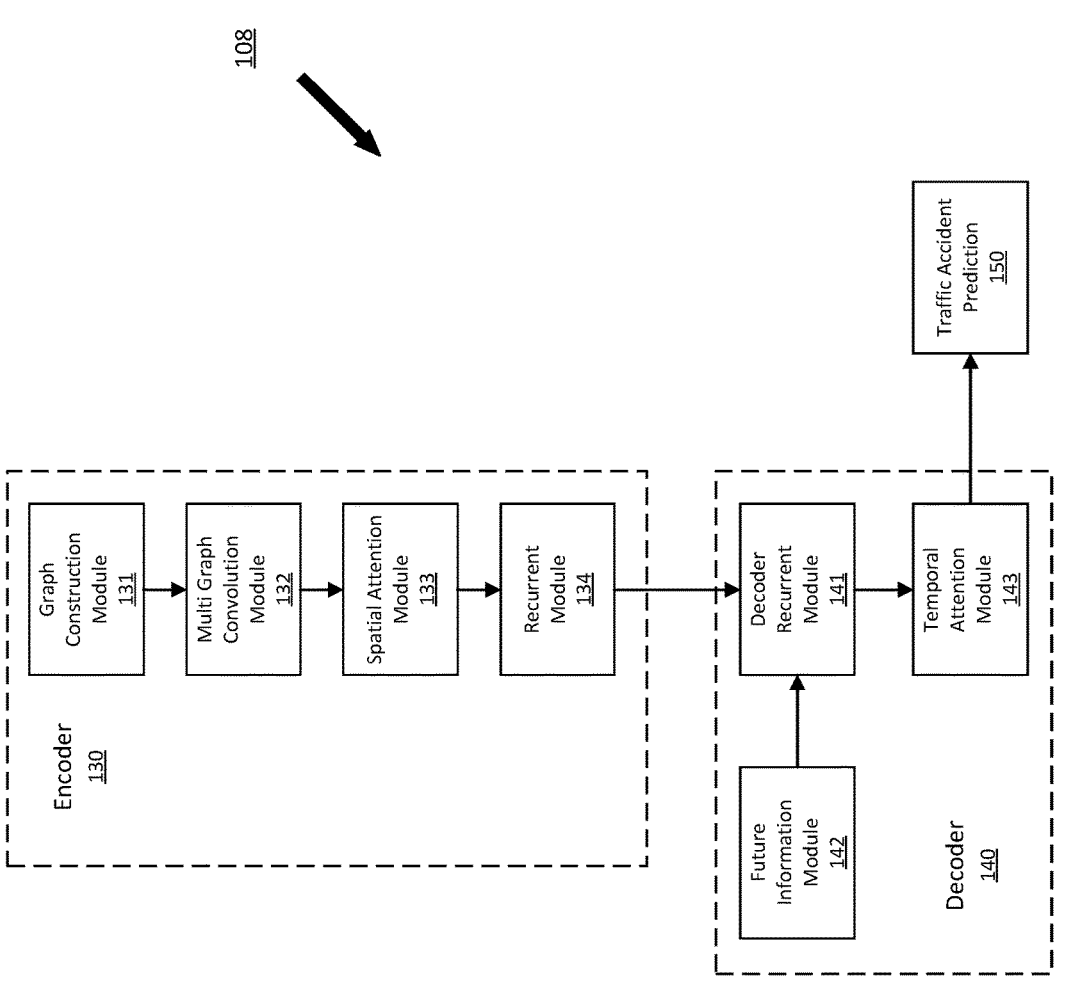
FIG. 2 illustrates an example accident prediction model to be implemented into a traffic accident prediction system, according to an aspect of the present disclosure.

FIG. 2 illustrates an accident prediction model 108 for use in a traffic accident prediction system 102. According to an embodiment of the present disclosure, the accident prediction model 108 may be implemented as a spatiotemporal attention-based multi-graph convolution neural network. Such a network may be comprised of an encoder 130, a decoder 140, and a traffic accident prediction 150.

In embodiments of the present disclosure, methods and systems for the prediction of traffic accidents in a predetermined area over a predetermined period of time are provided. The predetermined area of interest is defined as an undirected graph, G, consisting of all sets of nodes, V, and edges, E. An adjacency matrix, A, represents the interconnections of nodes. Therefore the predetermined area of interest (area network) can be defined by G=(V, E, A). Each node in the area network samples D records at the same frequency.

In embodiments of the present disclosure, the accident prediction model 108 determines a spatiotemporal-based traffic accident prediction, which can be perceived as a mapping function $f(\cdot)$ on the premise of area network, G, with a feature matrix set, X, that contains known traffic information and external observations extracted, where the feature matrix of each sample is defined as $x \in R^{n \times S \times D}$ and the features of the i-th node in each sample as $x_i \in R^{S \times D}$, where n is the number of nodes and S is the length of the historical time series.

The output of this mapping function is a traffic accident count C, where the count is expressed as $C \in R^{m \times n \times T}$, where m is the number of samples from the original data and T is the length of the predetermined time period.

In embodiments of the present disclosure, the accident prediction model 108 performs an accident prediction that can be expressed by Formula 1 below, where $X^{(t-S):t} \in R^{m \times n \times S \times D}$ and $C^{(t+1):(t+T)} \in R^{m \times n \times T}$.

$$\left(X^{(t-S):t},\ G\right) \xrightarrow{f(\cdot)} C^{(t+1):(t+T)} \qquad \text{Formula 1}$$

The accident prediction model 108, given a spatiotemporal field G, a matrix set X, the number of traffic accidents C in each area up to time T, a training dataset defined by Formula 2, and a testing dataset defined by Formula 3 below, finds the mapping function $f(\bullet)$ that can predict $C^{(t+1):(t+T)}$ while minimizing prediction error.

$$D_{train} = \left\{\left(X_{train}^{(t-S):t},\ G\right),\ C_{train}^{(t+1):(t+T)}\right\} \qquad \text{Formula 2}$$

$$D_{test} = \left\{\left(X_{test}^{(t-S):t},\ G\right),\ C_{test}^{(t+1):(t+T)}\right\} \qquad \text{Formula 3}$$

In an embodiment of the present disclosure, the encoder 130 may contain a graph construction module 131, a multi-graph convolution module 132, a spatial attention module 133, and a recurrent module 134.

The graph construction module 131 is used to extract local spatial dependencies hidden in the input data. It does so by constructing multiple different graphs of the input data. In one embodiment, the graph construction module 131 generates a distance graph. The distance graph allows for the analysis of physical space distribution in order to extract spatial features by taking into account the correlations and influence neighboring areas have on each other. The distance graph takes in the geographic coordinates of the area where an accident occurred and graphs an edge between said area and any other node representing a different geographical area according to Formula 4 below, where $\varepsilon$ is the distance threshold, and $d_{i,j}$ is the distance between node i and node j.

$$\tilde{A}_{dis} = \begin{cases} 1, & d_{i,j}^{-1} > \varepsilon \\ 0, & d_{i,j}^{-1} \leq \varepsilon \end{cases} \qquad \text{Formula 4}$$

The graph construction module 131 also generates an adaptive adjacency matrix that can directly learn hidden dependencies of nodes from a large amount of data without any prior knowledge. The graph construction module 131 generates the adaptive adjacency matrix according to Formula 5 below, where $E_1$ is regarded as source embedding and $E_2$ is regarded as target node embedding and both $E_1$ and $E_2$ contain learnable parameters.

$$\tilde{A}_{adp} = softmax\left(ReLU\left(E_1 E_2^T\right)\right) \qquad \text{Formula 5}$$

The product of E1 and E2 is the weight of the spatial dependence of the two nodes. The softmax function is utilized to standardize the adaptive adjacency matrix, while the rectified linear unit (ReLU) activation function is utilized to eliminate weak connections.

The encoder 130 may also contain a multi-graph convolution module 132. The multi-graph convolution module 132 performs a multi-layer graph convolution with a layer-wise propagation rule as shown in Formula 3 below. Through this operation the module 132 parameterizes the convolution kernel and defines the node weight matrix from a spatial perspective to reduce time and space complexity. In Formula 6, $\tilde{A} = A + I_N$, $\tilde{A} \in R^{n \times n}$ denotes the adjacency matrix of the undirected graph G with self-loops to take into account the information of the node and its neighboring nodes.

$$\tilde{A} = \tilde{D}^{-\frac{1}{2}} \tilde{A} \tilde{D}^{-\frac{1}{2}}$$

denotes the normalized adjacency matrix, where $\widetilde{D}_{ij}$ equals $\Sigma_j \widetilde{A}_{ij}$. $H^{(l)}$ represents the feature matrix of all nodes in layer l. $W^{(l)}$ represents the corresponding trainable matrix that will be updated during training. The symbol $\sigma$ represents a non-linear activation function, such as the ReLU function.

$$H^{(l+1)} = \sigma\left(\tilde{D}^{-\frac{1}{2}} \tilde{A} \tilde{D}^{-\frac{1}{2}} H^{(l)} W^{(l)}\right) \qquad \text{Formula 6}$$

The multi-graph convolution module 132 combines distance spatial information and self-learned hidden graph dependencies from the previously constructed graphs in order to learn features of the fused graphs, where the features of the distance graph and the self-adaptive adjacency matrix are combined according to Formula 7 below, which results in a propagation rule defined by Formula 8 below.

$$Z = [A_{dis} \| A_{adp}] \qquad \text{Formula 7}$$

$$H^{(l+1)} = \sigma(ZH^{(l)}W^{(l)}) \qquad \text{Formula 8}$$

By combining features from multiple graphs, the multi-graph convolution module 132 aggregates the transformed feature information from the different neighborhoods of each node. Accordingly, the multi-graph convolution module 132 further updates the feature matrix. In some embodiments of the present disclosure, the multi-graph convolution module takes the form of a graph convolutional network (GCN).

The encoder 130 may also contain a spatial attention module 133. The spatial attention module 133 captures how the traffic conditions of different areas influence each other and how these correlations change over time. The spatial attention module 133 applies an attention mechanism defined below in Formula 9-11. The weight from $v_i$ to its neighboring node $v_j$ is defined by Formula 10, where a is a vector of learnable parameters.

$$e_{ij} = \text{Leaky } ReLU\left(a^T\left[W^{(l)}H_i^{(l)} W^{(l)}H_j^{(l)}\right]\right) \qquad \text{Formula 9}$$

$$\alpha_{ij} = softmax\ (e_{ij}) = \frac{\exp\ (e_{ij})}{\sum_{v_k \in N(v_i)} \exp\ (e_{ik})} \qquad \text{Formula 10}$$

$$H^{(l+1)} = \sigma\left(\sum_{v_j \in N(v_i)} a_{ij} W^{(l)} H_j^{(l)}\right) \qquad \text{Formula 11}$$

The output of the spatial attention module 133 is a matrix set of spatial features, $\widetilde{X_t}$, extracted by the multi-graph convolution module 132 and the spatial attention module 133 according to formula 12 below.

$$\widetilde{X_t} = AMGconv(X_t, Z) \qquad \text{Formula 12}$$

The encoder 130 may contain a recurrent module 134. The recurrent module 134 may be implemented as a recurrent neural network, such as a long term short memory (LTSM). In an embodiment of the present disclosure, the LTSM is structured according to Formulas 13-17 listed below.

$$i_t^{(l)} = \sigma\left(W_{i1}^{(l)}H_{t-1}^{(l)} + W_{i2}^{(l)}\tilde{X}_t^{(l)} + b_i^{(l)}\right) \qquad \text{Formula 13}$$

$$o_t^{(l)} = \sigma\left(W_{o1}^{(l)}H_{t-1}^{(l)} + W_{o2}^{(l)}\tilde{X}_t^{(l)} + b_o^{(l)}\right) \qquad \text{Formula 14}$$

$$f_t^{(l)} = \sigma\left(W_{f1}^{(l)}H_{t-1}^{(l)} + W_{f2}^{(l)}\tilde{X}_t^{(l)} + b_f^{(l)}\right) \qquad \text{Formula 15}$$

$$c_t^{(l)} = f_t^{(l)} \odot c_{t-1}^{(l)} + i_t^{(l)} \odot \tanh\left(W_{c1}^{(l)}H_{t-1}^{(l)} + W_{c2}^{(l)}\tilde{X}_t^{(l)} + b_c^{(l)}\right) \qquad \text{Formula 16}$$

$$H_t^{(l)} = o_t^{(l)} \odot \tanh\left(c_t^{(l)}\right) \qquad \text{Formula 17}$$

The feature matrix for the current time stamp is calculated using the previous hidden status $H_{t-s-1}$ and $\widetilde{X_{t-s}}$ at time step t−s, s∈{0, 1, . . . , S}.

The recurrent module 134 calculates these recurrent units and stores all of the spatiotemporal information collected in the encoder 130 in a context vector, C. This context vector serves as the connection between the encoder 130 and decoder 140.

The accident prediction model 108 contains a decoder 140. The decoder may contain a decoder recurrent module 141, a future information module 142, and a temporal attention module 143.

The decoder 140 may contain a decoder recurrent module 141 and a future information module 142. The decoder recurrent module 141 may be implemented as a recurrent neural network, such as a LTSM. The decoder recurrent module uses the context vector C as its initial hidden state to decode output sequences.

The future information module provides the decoder recurrent module 141 with known future inputs, $E_{t+k}^i$, which contain date and historical statistic information, in order to avoid increasing the complexity and calculation burden of the accident prediction model 108 and to increase the prediction accuracy. The output of the decoder recurrent module 141 is defined by Formula 18 below.

$$H_{t+k} = \begin{cases} \text{decoder cell}\left(C, E_{t+k}^i\right), k = 1 \\ \text{decoder cell}\left(H_{t+k-1}, E_{t+k}^i\right), k \in \{2, 3, \dots, T\} \end{cases} \qquad \text{Formula 18}$$

The decoder 140 may also contain a temporal attention module 143. The temporal attention module 143 applies a temporal attention mechanism that adds an attention weight for each time step to adaptively assign different importance to different time periods. The temporal mechanism captures the relevance of source-side information so that the network can directly focus on important time steps in the past to help predict future accidents more accurately. The temporal attention module 143 applies the temporal attention mechanism as defined in Formulas 19-21, where $$H_{t-s}^{(l)}$$

represents intermediate features extracted by the lower level of the network and where the attention vector for t−s is β(t, s)∈[0,1], s∈{0, 1, . . . , S}. β(t, s) also represents the normalization of $$\eta_t^{t-s}$$

that can be used to measure the similarity between $$H_t^{(l)} \text{ and } H_{t-s}^{(l)},$$

and β(t, s) is further utilized as the weight coefficient to calculate $$H_t'^{(l)}$$

$$\eta_t^{t-s} = W_\eta \tanh\left(H_t^{(l)}W_f H_{t-s}^{(l)}\right) \qquad \text{Formula 19}$$

$$\beta(t, s) = \text{softmax}\left(\eta_t^{t-s}\right) \qquad \text{Formula 20}$$

$$H_t'^{(l)} = \sum_{s=0}^{S} \beta(t, s)H_{t-s}^{(l)} \qquad \text{Formula 21}$$

By iteratively training the accident prediction model 108, the feature matrices for each time step for a predetermined period time, which is the output of the decoder 140, are used to construct traffic accident prediction 150, which in some embodiments may be visualized through traffic accident prediction map, to better predict where traffic accidents may occur in the future and where public resources should be stationed in order to best respond to these accidents.

Figure 3:
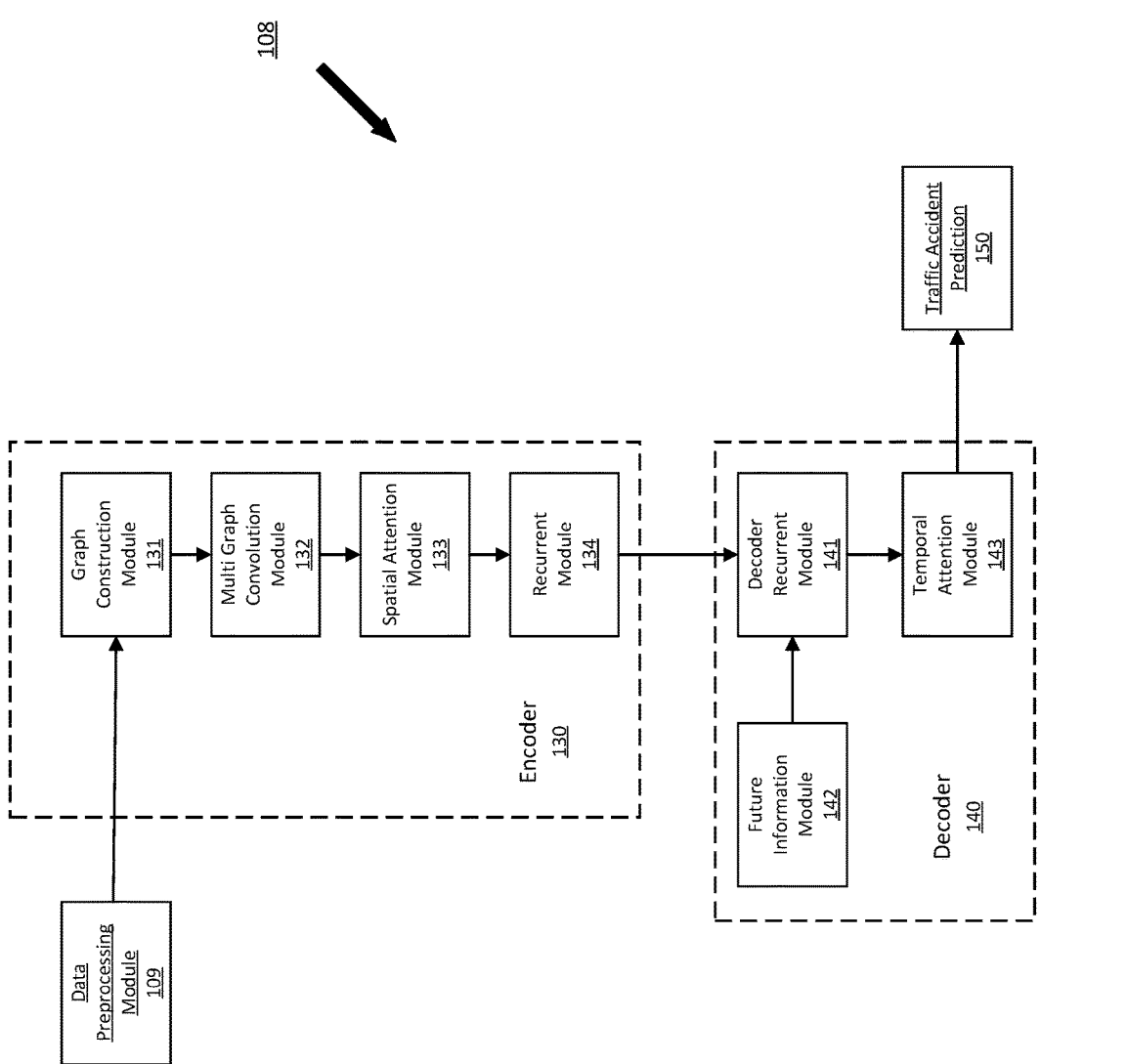
FIG. 3 illustrates an example accident prediction model with a preprocessing module to be implemented into a traffic accident prediction system, according to an aspect of the present disclosure.

FIG. 3 illustrates an accident prediction model 108 according to another embodiment of the present disclosure, wherein an accident prediction model 108 contains a data preprocessing module 109 that preprocesses received traffic accident information to extract a feature matrix to be input into the encoder 130 of the accident prediction model 108. The multidimensional feature matrix may contain spatiotemporal information i.e. the specific location and time related to traffic accidents received in the traffic accident information, and it may also contain other external attributes, such as weather condition, road type, construction status (whether construction is taking place in a specific location at a specific time), or event status (whether an event is taking place in a specific location at a specific time that results in some modification to the road or traffic pattern).

Figure 4:
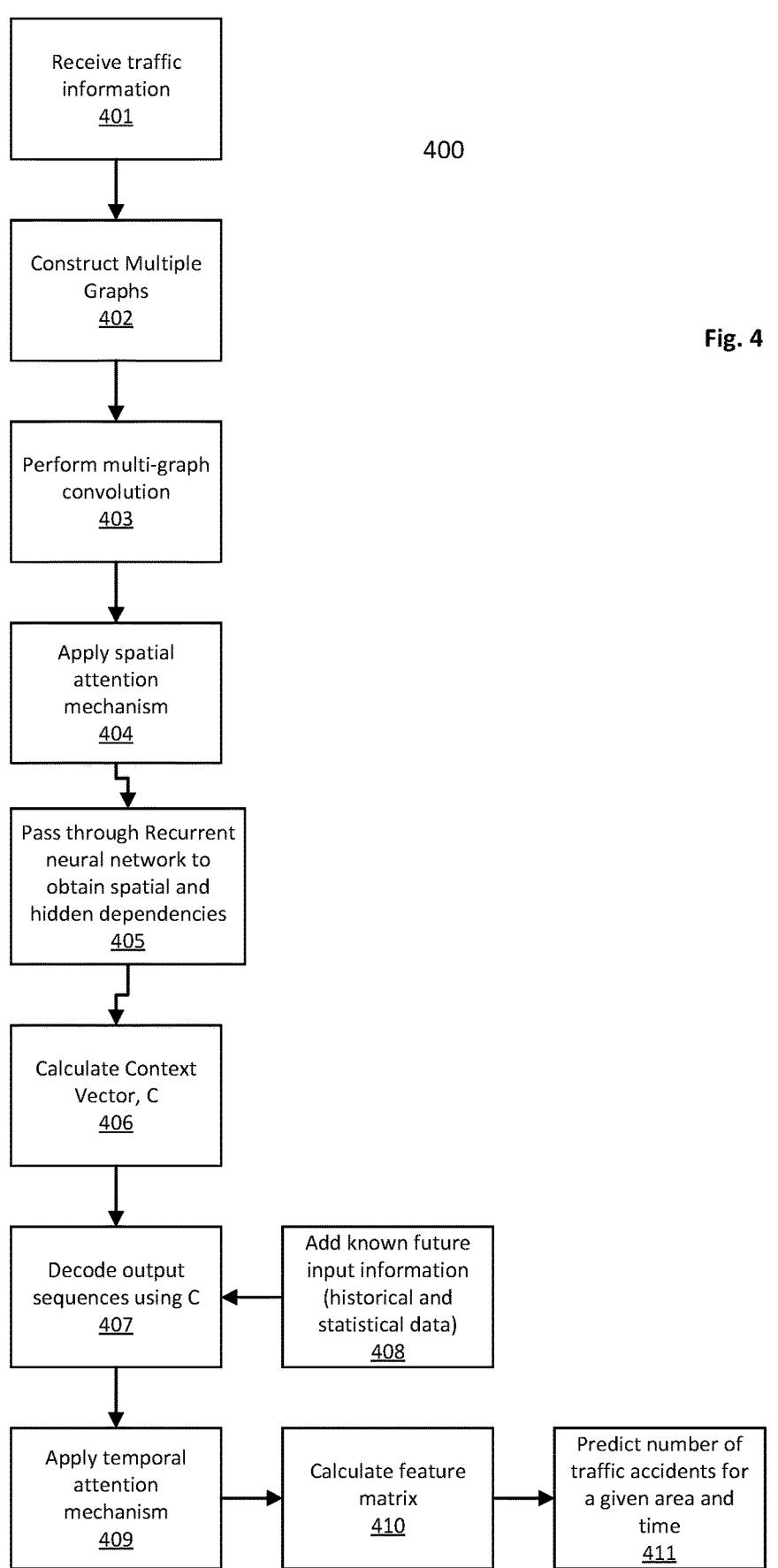
FIG. 4 is a flowchart of the functions of the accident prediction system, according to embodiments of the present disclosure.

FIG. 4 shows a flowchart of hierarchy of functions performed in an example implementation 400 of an accident prediction model 108, according to various embodiments of the present disclosure. At block 401, the accident prediction model receives information related to traffic accidents. In some embodiments of the present disclosure, the implementation of the accident prediction model 108 is such that it is configured to receive traffic accident data in the form of an extracted feature matrix, which may contain spatiotemporal and external attributes. In other embodiments, the accident prediction model 108 is implemented in such a way to extract a feature matrix of features of interest from the received traffic information.

At block 402, the accident prediction model 108 constructs multiple graphical representations from the feature matrix, such as a distance graph and a self-adaptive adjacency matrix.

At block 403, the accident prediction model 108 performs a multi-layer multi-graph convolution with a layer-wise propagation rule defined according to Formula 5.

At block 404, the accident prediction model 108 applies a spatial attention mechanism as defined by Formulas 6-8 in order to adaptively capture dynamic correlations of spatial dimensions between nodes in the area network of interest.

At block 405, the accident prediction model 108 passes the feature matrix, which contains the spatial features extracted through the multi-layer multi-graph convolution and application of the spatial attention mechanism, through a recurrent neural network. In some embodiments, the recurrent neural network is an LTSM defined by Formulas 10-14, that calculates current time features using previous hidden statuses.

At block 406, the accident prediction model 108 uses the calculations of the recurrent units through the recurrent neural network to develop to context vector, C, which stores all of the spatiotemporal information of the encoder 130 of an accident prediction model 108.

At block 407, the context vector, C, is passed to a decoder which uses C as the initial hidden state to decode output sequences using Formula 15. At block 408, known future inputs such as historical and statistical data related to traffic accidents in a predetermined area are also fed into the decoder at this stage.

At block 409, the accident prediction model applies a temporal attention mechanism to adaptively assign different weights of importance to different time periods according to formula 16-18.

At block 410, the result of the temporal attention mechanism being applied is a feature matrix defined by Formula 8.

At block 411, the accident prediction model 108 uses the previously calculated feature matrix to determine a predicted number of traffic accidents in a given area over a predetermined amount of time. In some embodiments of the present disclosure, the predicted number of traffic accidents in a given area over a predetermined amount of time is visualized in the form of a traffic accident prediction map that updates at each time step of time sequence data that is the input to the accident prediction model 108.

Figure 5:
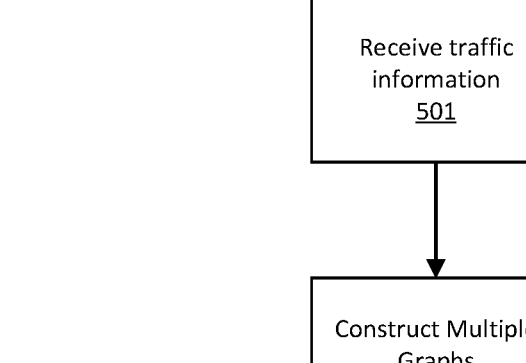
FIG. 5 is a flowchart of an example method of predicting traffic accidents, according to embodiments of the present disclosure.

FIG. 5 shows an example method 500 for predicting traffic accidents in a predetermined area over a predetermined amount of time, according to embodiments of the present disclosure. In an embodiment of the present disclosure, a method for predicting traffic accidents 500 consists of receiving traffic accident data from a predetermined area 501. The method 500 continues by constructing multiple graphical representations based on the features of interest present in the received data 502, training an accident prediction model 503 to determine a predicted amount of traffic accidents 504 over a predetermined amount of time. In various embodiments, the steps of receiving traffic accident data 501 and constructing multiple graphical representations based of features of interest 502 are carried out within an accident prediction model.

Figure 6:
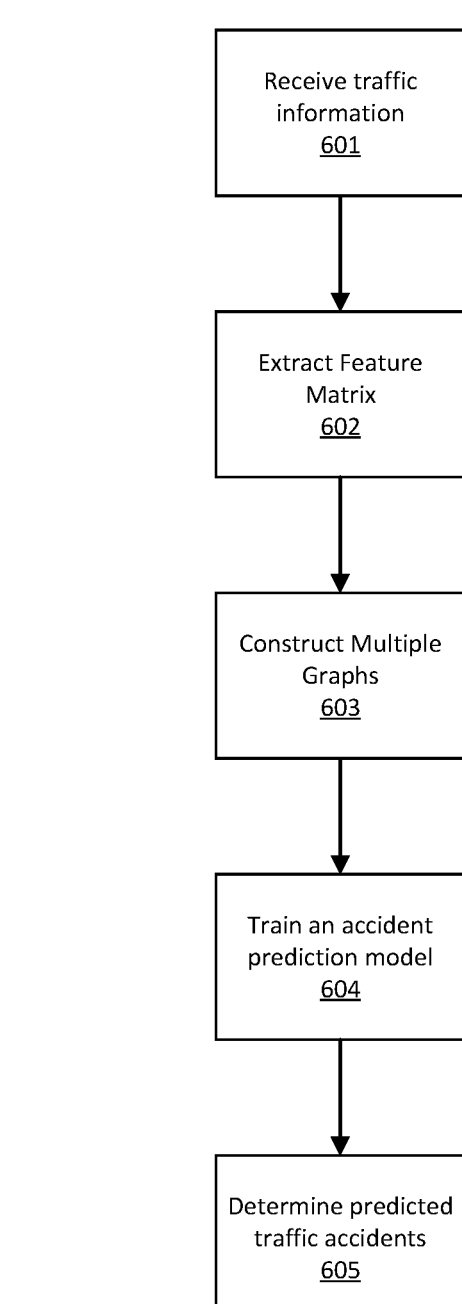
FIG. 6 is a flowchart of an example method of predicting traffic accidents, according to embodiments of the present disclosure.

FIG. 6 shows an example method 600 for predicting traffic accidents in a predetermined area over a predetermined amount of time. In an embodiment of the present disclosure, a method for predicting traffic accidents 600 consists of receiving traffic accident data from a predetermined area 601. The method 600 continues by extracting a multidimensional feature matrix of features of interest, such as spatiotemporal or external attributes, from the received data 602, constructing multiple graphical representations based on the features of interest present in the received data 603, training an accident prediction model 604 to determine a predicted amount of traffic accidents 605 over a predetermined amount of time. In various embodiments, the steps of receiving traffic accident data 601, extracting a multidimensional feature matrix of features of interest 602, and constructing multiple graphical representations based of features of interest 603 are carried out within an accident prediction model.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A traffic accident prediction system comprising:
   a memory; and
   a processor in communication with the memory, the processor configured to:
      receive information related to traffic accidents in an area of interest;
      extract a feature matrix of features of interest from the received traffic information;
      construct a plurality of graphical representations from the feature matrix of features of interest;
      perform a multi-layer multi-graph convolution with a layer-wise propagation rule;
      apply a spatial attention mechanism formula, wherein the spatial attention mechanism formula adaptively captures dynamic correlations of spatial dimensions between nodes in the area of interest;
      pass a feature matrix containing spatial features extracted through the multi-layer multi-graph convolution and application of the spatial attention mechanism through a recurrent neural network,
      use calculations of recurrent units through the recurrent neural network to develop to context vector ("C"), wherein the context vector C stores spatiotemporal information of an encoder of an accident prediction model;

pass the context vector, C, to a decoder, wherein the decoder uses C as an initial hidden state to decode output sequences using a decoding formula;

apply a temporal attention mechanism to adaptively assign different weights of importance to different time periods;

create a feature matrix of temporal attention mechanism; and use the feature matrix of temporal attention mechanism to determine a predicted number of traffic accidents in a given area over a predetermined amount of time.

2. The traffic accident prediction system of claim 1, wherein the processor is configured to preprocess the received information for use in the accident prediction model, by extracting a feature matrix of features of interest from the received information related to traffic accidents.

3. The traffic accident prediction system of claim 1, wherein the accident prediction model combines multiple graphical representations of the received information related to traffic accidents using a graph convolutional network.

4. The traffic accident prediction system of claim 1, wherein the accident prediction model performs a mapping function to predict an accident number count for a predetermined area over a predetermined period of time.

5. The traffic accident prediction system of claim 1, wherein the accident prediction model is an attention-based multi-graph convolutional network.

6. The traffic accident prediction system of claim 1, wherein the accident prediction model is comprised of a plurality of machine learning models.

7. The traffic accident prediction system of claim 1, wherein the accident prediction model outputs the predicted amount of traffic accidents in a predetermined geographic region over a predetermined period of time in the form of a traffic accident prediction map.

8. A traffic accident prediction method comprising:

receiving information related to traffic accidents in an area of interest;

extracting a feature matrix of features of interest from the received traffic information;

constructing a plurality of graphical representations from the feature matrix of features of interest;

performing a multi-layer multi-graph convolution with a layer-wise propagation rule;

applying a spatial attention mechanism formula, wherein the spatial attention mechanism formula adaptively captures dynamic correlations of spatial dimensions between nodes in the area of interest;

passing a feature matrix containing spatial features extracted through the multi-layer multi-graph convolution and application of the spatial attention mechanism through a recurrent neural network, using calculations of recurrent units through the recurrent neural network to develop to context vector ("C"), wherein the context vector C stores spatiotemporal information of an encoder of an accident prediction model;

passing the context vector, C, to a decoder, wherein the decoder uses C as an initial hidden state to decode output sequences using a decoding formula;

applying a temporal attention mechanism to adaptively assign different weights of importance to different time periods;

creating a feature matrix of temporal attention mechanism; and using the feature matrix of temporal attention mechanism to determine a predicted number of traffic accidents in a given area over a predetermined amount of time.

9. The traffic accident prediction method of claim 8, wherein the method further comprises, extracting a feature matrix from the received information related to traffic accidents which is used to construct multiple graphical representations of the received information.

10. The traffic accident prediction method of claim 8, wherein receiving information related to traffic accidents, includes receiving a feature matrix of features of interest for a predetermined area and over a predetermined time.

11. The traffic accident prediction method of claim 8, wherein constructing multiple graphical representations of the received information includes an adaptive adjacency matrix, which self-learns hidden dependencies between entries in a feature matrix included in the received information.

12. The traffic accident prediction method of claim 8, wherein the method further comprises, visually projecting a predicted number of traffic accidents on a traffic accident prediction map.

13. The traffic accident prediction method of claim 8, wherein training a machine learning model comprises:

extracting features of interest from the received information;

performing a multi-graph, multi-layer convolution;

applying a spatial attention mechanism;

implementing a recurrent network to update future calculations based on past calculations;

supplying the machine learning model with known future information applying a temporal attention mechanism; and outputting a predicted number of traffic accidents for a predetermined area over a predetermined period of time.

14. The traffic accident prediction method of claim 13, wherein implementing a recurrent network includes a long term short memory neural network.

15. The traffic accident prediction method of claim 13, wherein outputting a predicted number of traffic accidents for a predetermined area over a predetermined period of time includes visually projecting the predicted number of traffic accidents on a traffic accident prediction map.

* * * * *